(12) United States Patent
Ciholas et al.

(10) Patent No.: US 9,709,663 B1
(45) Date of Patent: Jul. 18, 2017

(54) METHOD FOR LOCATION DETERMINATION USING RADIO SIGNALS

(71) Applicant: CIHOLAS, INC, Newburgh, IN (US)

(72) Inventors: Mike Ciholas, Evansville, IN (US); Justin E Bennett, Newburgh, IN (US); Daniel L Morris, Evansville, IN (US)

(73) Assignee: Ciholas, Inc., Newburgh, IN (US)

( * ) Notice: Subject to any disclaimer, the term of this patent is extended or adjusted under 35 U.S.C. 154(b) by 0 days.

(21) Appl. No.: 14/998,552

(22) Filed: Jan. 20, 2016

(51) Int. Cl.
    *H04W 24/00*     (2009.01)
    *G01S 5/02*     (2010.01)
    *H04W 4/02*     (2009.01)
    *G01S 5/30*     (2006.01)
    *G01S 13/76*     (2006.01)

(52) U.S. Cl.
    CPC .......... *G01S 5/0289* (2013.01); *H04W 4/023* (2013.01); *G01S 5/30* (2013.01); *G01S 13/765* (2013.01)

(58) Field of Classification Search
    CPC ........ G01S 5/0289; G01S 13/765; G01S 5/30; H04W 4/023
    See application file for complete search history.

(56) References Cited

U.S. PATENT DOCUMENTS

| | | | |
|---|---|---|---|
| 2008/0231498 A1* | 9/2008 | Menzer | ...... G01S 7/28 342/134 |
| 2010/0008270 A1* | 1/2010 | Ahn | ........ G01S 11/02 370/310 |

* cited by examiner

*Primary Examiner* — Barry Taylor
(74) *Attorney, Agent, or Firm* — Martin IP Law Group; C. Richard Martin, Esq.

(57) ABSTRACT

A system and method for location of objects in 2-dimensional and 3-dimensional space using a minimum number of timed RF transmissions. System consists of a mobile device and a plurality of surveyed anchors. Two-Way Ranging (TWR) is done between the tag and any single anchor and the distance between the tag and remaining anchors is determined through listening to, or snooping, the TWR packet transmissions.

8 Claims, 4 Drawing Sheets

FIG. 1 System Node Representation

FIG. 3 Time Delay Representation of Three Transmissions

METHOD FOR LOCATION DETERMINATION USING RADIO SIGNALS

FIELD OF THE INVENTION

The present invention relates to location of objects using radio frequency (RF) transmissions.

BACKGROUND OF THE INVENTION

Existing systems that use RF transmissions to determine distance between devices use a method described as Two Way Ranging (TWR). In TWR the distance between RF devices is determined using a series of at least three transmissions. Determining relative position of multiple devices in 2D and 3D space using TWR requires $3^{N-1}$ (where N is the number of devices) transmissions. The total number of transmissions for determining location with TWR becomes cumbersome for electronic devices by consuming RF air time and battery power.

To reduce time spent sending and receiving RF transmissions, as well as reduce battery usage, a method is needed to determine the distances between multiple devices using a single set of three transmissions. Such a system provides a huge advantage over traditional TWR systems that require $3^{N-1}$ transmissions.

SUMMARY OF THE INVENTION

A system of RF devices capable of sending and receiving signals and accurately measuring transmit and receive times. Given sufficient granularity of measured time the distances between objects are determined mathematically.

In one embodiment of the invention the distances between objects are used to determine the location of a mobile device with respect to surveyed devices in a 2-dimensional (2D) space, using only three RF transmissions between the devices.

In another embodiment of the invention the distances between objects are used to determine the location of a mobile device with respect to surveyed devices in 3-dimensional (3D) space, using only three RF transmissions between the devices.

The invention accordingly comprises several steps, the relation of one or more of those steps, the embodiment of the construction of the apparatus' features, and the combinations of the elements and arrangement of parts adapted to affect such steps. All is exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
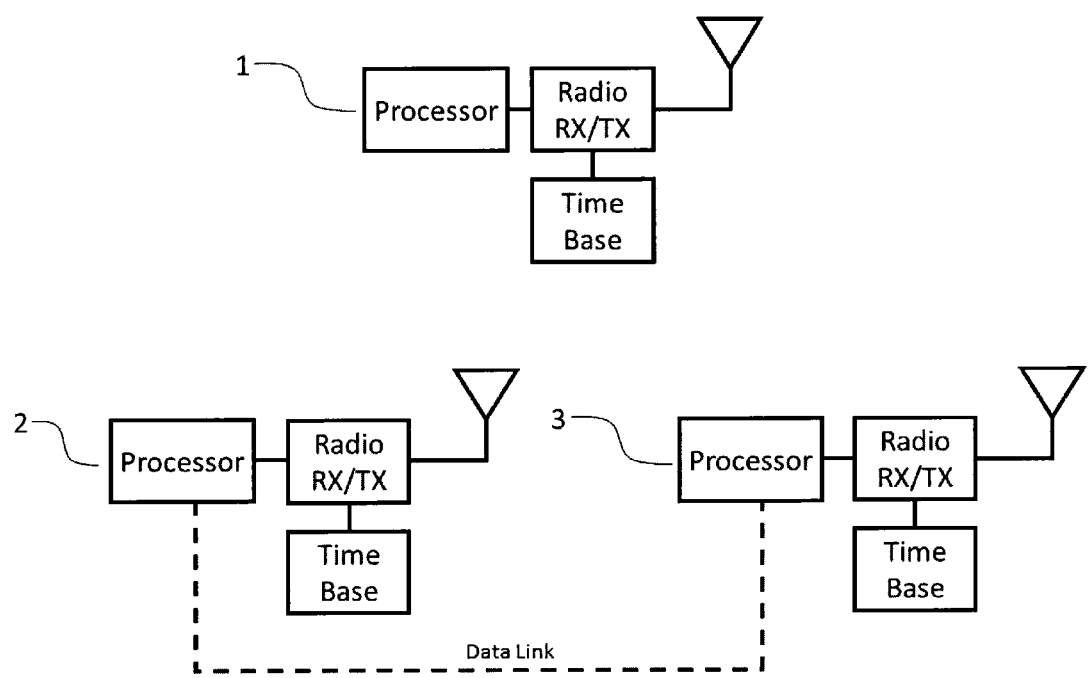
FIG. 1 is an example arrangement of RF capable nodes.

In accordance with the first aspect of the invention, a system for tracking a mobile object in 2D space includes an RF tag object and system of anchor objects shown in FIG. 1. The tag object [1] is mobile in the environment and is capable of transmitting and receiving RF transmissions. The tag object [1] is also capable of precise timing of RF reception and transmission. The system of anchors consists of a first anchor object [2], capable of timing transmission and reception of RF transmissions, and a plurality of anchor objects [3] capable of timing reception of RF transmissions. The first anchor object [2], and the plurality of anchor objects [3] are located in known, or surveyed, positions in the environment.

Figure 2:
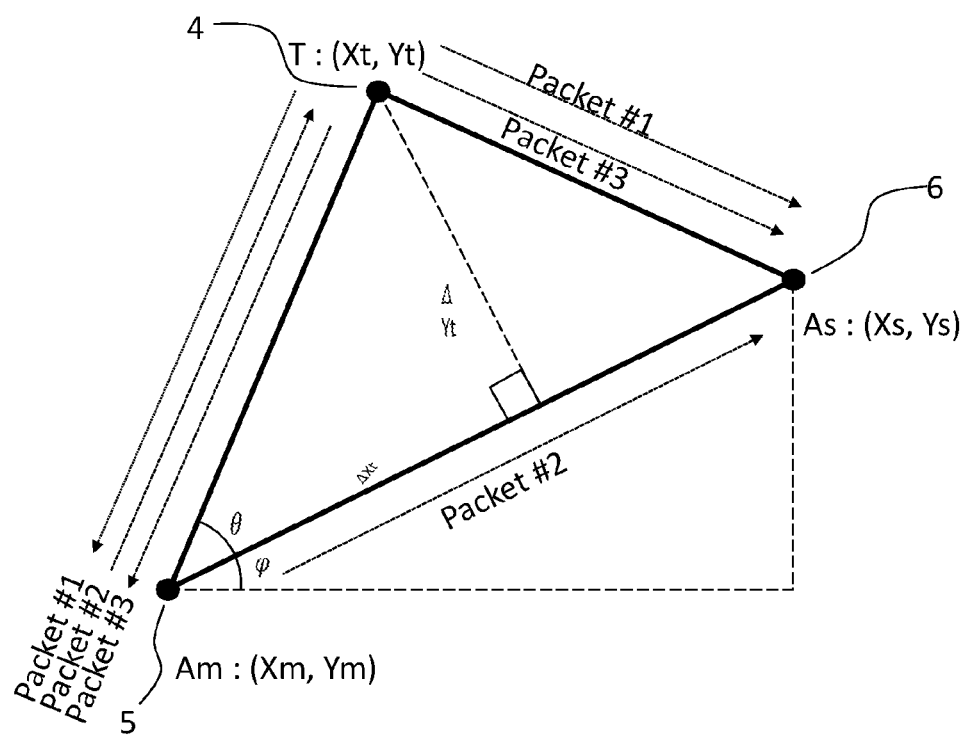
FIG. 2 is an example of a 2D capable RF node arrangement.
Figure 3:
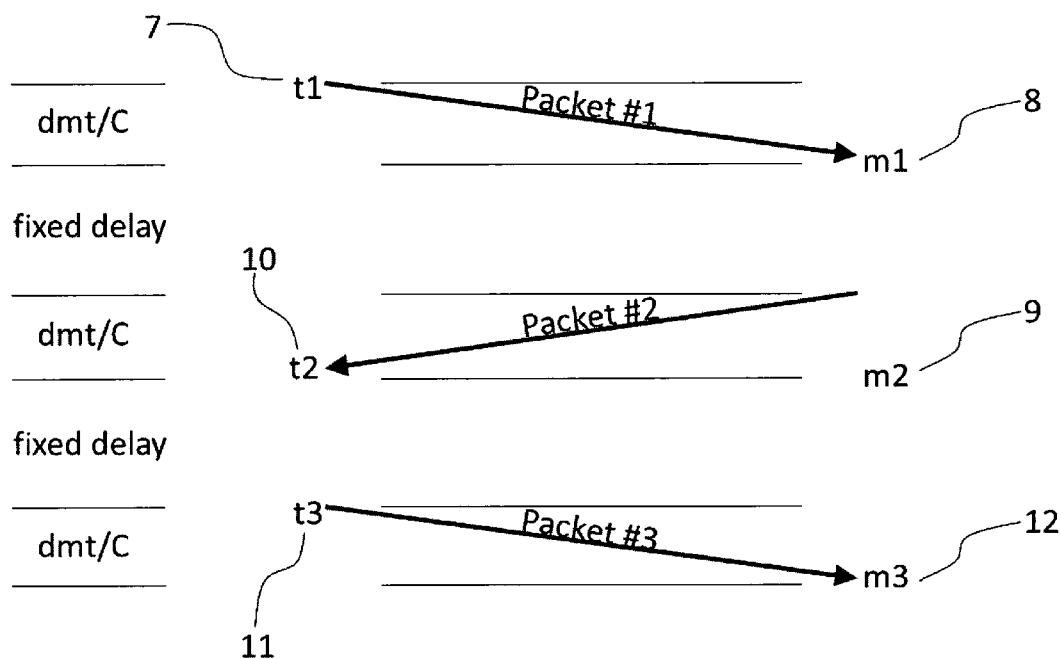
FIG. 3 is a notional time delay representation of three RF packets exchanged between two devices.

The arrangement in FIG. 2 shows an exemplary arrangement of a preferred embodiment. In FIG. 2, one sees a tag object T [4] as well as two anchor objects Am [5] and As [6]. In this arrangement a series of three packets are exchanged between the tag T [4] and anchor Am [5]. FIG. 3 shows a notional representation of the three packet transmissions and timing. In FIG. 3, time $t_1$ [7] is the transmit time for the first packet transmitted by tag T [4] as measured in that tags T [4] time base. Time $m_1$ [8] is the reception time for the first packet at the anchor Am [5] as measured in the anchors Am [5] time base. The following two packets have similar times $m_2$ [9], $t_2$ [10], $t_3$ [11], and $m_3$ [12] associated with them and measured in the respective devices time base. To produce a distance between the tag T [4] and anchor Am [5] the packet timings are combined in equation (1), where C is the speed of light and $d_{mt}$ is the output distance between the tag T [4] and the anchor Am [5]:

$$d_{mt} = C \frac{(t_2 - t_1) - (m_2 - m_1) + (m_3 - m_2) - (t_3 - t_2)}{4} \quad (1)$$

In the above equation the distance $d_{mt}$ is obtained between the two devices. Since the anchors are in surveyed locations the distance $d_{ms}$ between anchor Am [5] and As [6] is also known. The three packets shown in FIG. 3 are also received at anchor As [6] as measured in anchor As [6] time base. By listening, or snooping, these transmissions it is possible to generate another set of time stamps for the system reception of packet one at As [6] ($s_1$), packet two at As [6] ($s_2$), and packet three at As [6] ($s_3$). These new timestamps are combined with $d_{mt}$ and $d_{ms}$ in equation order to generate a distance between the anchor As [6] and the tag T [4] ($d_{st}$)

$$d_{st} = d_{ms} - C\left(\frac{(s_3 - s_1)}{(t_3 - t_1)} \cdot (s_2 - s_1) + t_1\right) + \\ C\left(\frac{(m_3 - m_1)}{(t_3 - t_1)} \cdot (m_2 - m_1) + t_1\right) + d_{mt} \quad (2)$$

Given the three distances $d_{mt}$, $d_{ms}$, and $d_{st}$ the location of the T [4] can be computed using standard trignometric constructs as follows in equation (3):

$$\Delta x_t = d_{mt}\cos(\pm\theta) \quad (3)$$
$$\Delta y_t = d_{mt}\sin(\pm\theta)$$
$$\gamma = \arctan\left(\frac{y_s - y_m}{x_s - x_m}\right)$$
$$\begin{bmatrix} x_t \\ y_t \end{bmatrix} = \begin{bmatrix} \cos\gamma & -\sin\gamma \\ \sin\gamma & \cos\gamma \end{bmatrix}\begin{bmatrix} \Delta x_t \\ \Delta y_t \end{bmatrix} + \begin{bmatrix} x_m \\ y_m \end{bmatrix}$$

Figure 4:
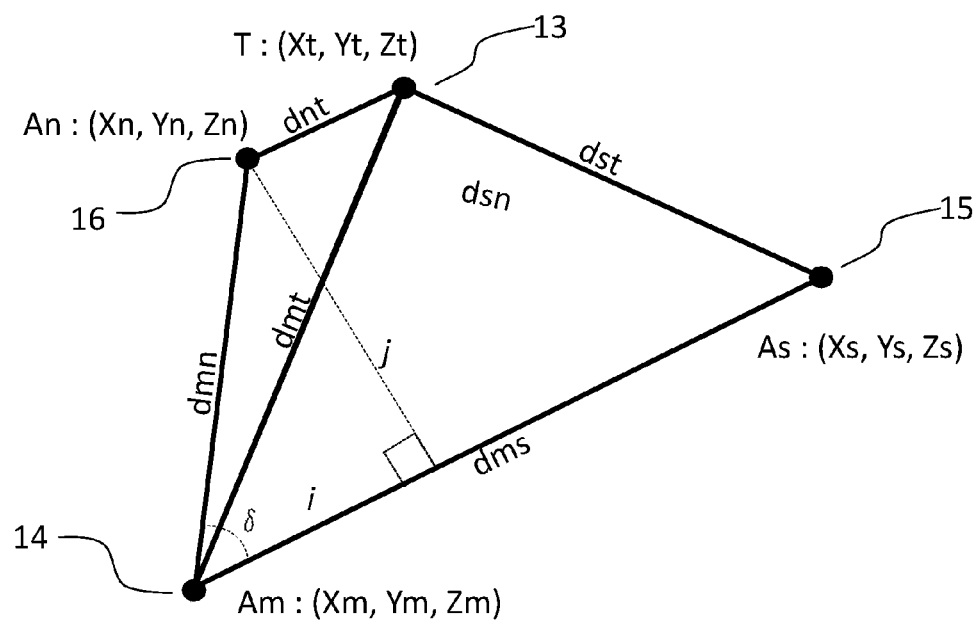
FIG. 4 is a 3D pyramid depicting the distances associated with a system used to obtain 3D position for a mobile node.

Yet another implementation includes the addition of one or more surveyed anchors in order to achieve a 3D position of the tag with respect to the anchors. The arrangement in FIG. 4 shows an exemplary arrangement of a plurality of anchors allowing for 3D position determination of tag T [13]. In the arrangement shown in FIG. 4 there is a mobile tag T [13] at an unknown location and multiple anchors Am [14], As [15], and An [16] at known, or surveyed, locations. Once again, the distances $d_{mt}$ and $d_{st}$ can be determined using equations (1) and (2) respectively. In order to locate the tag in 3D space it is also necessary to determine the distance $d_{nt}$ between the anchor An [16] and the tag T [13]. This can be done using the TWR Plus Snoop equation (2) substituting values associated with anchor An [16]. The distance $d_{mn}$ between anchor Am [14] and An [16] is substituted for $d_{ms}$. As with the above system it is possible to generate a set of time stamps ($n_1$, $n_2$, and $n_3$) for the reception of the three packets at An [16]. These values are substituted for ($s_1$, $s_2$, and $s_3$) respectively. The resultant equation (4) is used to determine the distance $d_{nt}$.

$$d_{nt} = \tag{4}$$
$$d_{mn} - C\left(\frac{(n_3 - n_1)}{(t_3 - t_1)}(n_2 - n_1) + t_1\right) + C\left(\frac{(m_3 - m_1)}{(t_3 - t_1)}(m_2 - m_1) + t_1\right) + d_{mt}$$

Given the distances between the anchors and the tag T [13] $d_{mt}$, $d_{nt}$ and $d_{st}$, along with the known locations and distances between the anchors it becomes possible to compute the location of T [13] using standard trigonometric constructs as follows in equation $$\alpha = \arctan\left(\frac{z_n - z_m}{y_n - y_m}\right)$$
$$\beta = \arctan\left(\frac{z_s - z_m}{x_s - x_m}\right)$$
$$\gamma = \arctan\left(\frac{y_s - y_m}{x_s - x_m}\right)$$

$$\begin{bmatrix} x_t \\ y_t \\ z_t \end{bmatrix} = \begin{bmatrix} 1 & 0 & 0 \\ 0 & \cos\alpha & -\sin\alpha \\ 0 & \sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix} \begin{bmatrix} \Delta x_t \\ \Delta y_t \\ \Delta z_t \end{bmatrix} + \begin{bmatrix} x_m \\ y_m \\ z_m \end{bmatrix}$$

The substitutions made above in equation (4) can be made for any number of anchors in the system allowing for position of the tag T [13] to be determined with greater accuracy.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A method for determining the location of a tag object in an unknown location using radio signals comprising the steps of:

transmitting a first RF data packet from said tag object (T) and recording the time (t1) at which the first RF data packet was transmitted;

receiving said first RF data packet at a primary stationary anchor (Am) at a first known location (Xm, Ym, Zm) and recording the time (m1) at which the first RF data packet was received at the primary stationary anchor (Am);

receiving said first RF data packet at a secondary stationary anchor (As) at a second known location (Xs, Ys, Zs), a first known distance (dms) between said first known location and said second known location being known, and recording the time (s1) at which the first RF data packet was received at the secondary stationary anchor (As);

transmitting a second RF data packet from said primary stationary anchor (Am) and recording the time (m2) at which the second RF data packet was transmitted;

receiving said second RF data packet at said tag object (T) and recording the time (t2) at which the second RF data packet was received at the tag object (T);

receiving said second RF data packet at said secondary stationary anchor (As) and recording the time (s2) at which the second RF data packet was received at the secondary stationary anchor (As);

transmitting a third RF data packet from said tag object (T) and recording the time (t3) at which the third RF data packet was transmitted;

receiving said third RF data packet at said primary stationary anchor (Am) and recording the time (m3) at which the third RF data packet was received at the primary stationary anchor (Am);

receiving said third RF data packet at said secondary stationary anchor (As) and recording the time (s3) at which the third RF data packet was received at the secondary stationary anchor (As);

communicating the collected timing data between the primary stationary anchor (Am) and the secondary stationary anchor (As);

computing a first unknown distance (dmt) between the tag object (T) and the primary stationary anchor (Am) based on the collected timing data;

computing a second unknown distance (dst) between the tag object (T) and the secondary stationary anchor (As) based on the timing data, the first known distance (dms) and the first unknown distance (dmt); and computing the location (xt, yt) of the tag object (T) based on the first known distance (dms), first unknown distance (dmt) and second unknown distance (dst).

2. The method for determining the location of a tag object (T) according to claim 1 wherein the step of computing the first unknown distance (dmt) is performed using the equation $$dmt = C\frac{(t_2 - t_1) - (m_2 - m_1) + (m_3 - m_2) - (t_3 - t_2)}{4}.$$

3. The method for determining the location of a tag object (T) according to claim 2 wherein the step of computing the second unknown distance (dst) is performed using the equation $$dst = dms - C\left(\frac{(s_3 - s_1)}{(t_3 - t_1)}(s_2 - s_1) + t_1\right) + C\left(\frac{(m_3 - m_1)}{(t_3 - t_1)}(m_2 - m_1) + t_1\right) + dmt.$$

4. The method for determining the location of a tag object (T) according to claim 3 wherein the step of computing the location (xt, yt) of the tag object (T) is performed using trigonometric relationships.

5. The method for determining the location of a tag object according to claim 1 wherein a plurality of secondary stationary anchors are provided, each one of said plurality of secondary stationary anchors being associated with a different known location and the distance between each secondary stationary anchor and the primary anchor is known;

said steps of receiving said first, second and third RF data packets at the secondary stationary anchor and recording the times are performed at each of the plurality of secondary stationary anchors;

said step of computing the distance between the tag object and the secondary stationary anchor is performed for each of the plurality of secondary stationary anchors; and said step of computing the location of the tag object provides the location of the tag object in three dimensions (xt, yt, zt).

6. The method for determining the location of a tag object according to claim 1 wherein first and second secondary stationary anchors are provided, said first secondary stationary anchor (As) associated with said second known location (Xs, Ys, Zs) and said second secondary stationary anchor (An) being associated with a third known location (Xn, Yn, Zn) and the distance between each of the first and second secondary stationary anchors and the primary anchor is known; said steps of receiving said first, second and third RF data packets at the secondary stationary anchor and recording the times are performed at each of the first and second secondary stationary anchors, wherein the first known distance (dms) is the distance between the primary stationary anchor (Am) and the first secondary stationary anchor (As) and a second known distance (dmn) is the distance between the primary stationary anchor (Am) and the second secondary anchor (An); said method comprising the further steps of:

computing a third unknown distance (dnt) between the tag object (T) and the second secondary stationary anchor (An) based on the collected timing data, the second known distance (dmn) and the calculated first unknown distance (dmt); and computing the location (xt, yt, zt) of the tag object (T) based on the computed unknown first distance (dmt), second unknown distance (dst) and third unknown distance (dnt).

7. The method for determining the location of a tag object (T) according to claim 6 wherein the step of computing the third unknown distance (dnt) is performed using the equation $$d_{nt} = d_{mn} - C\left(\frac{(n_3 - n_1)}{(t_3 - t_1)}(n_2 - n_1) + t_1\right)\Big/$$
$$\left(+C\left(\frac{(m_3 - m_1)}{(t_3 - t_1)}(m_2 - m_1) + t_1\right) + d_{mt}.$$

8. The method for determining the location of a tag object (T) according to claim 7 wherein the step of computing the location (Xt, Yt, Zt) of the tag object (T) is performed using trigonometric relationships.

* * * * *